United States Patent [19]
Taki

[11] Patent Number: 6,081,877
[45] Date of Patent: Jun. 27, 2000

[54] METHOD AND APPARATUS FOR FAST DATA TRANSFER USING INTERNAL CLOCK OF RELATIVELY LOW FREQUENCY

[75] Inventor: Nobuhiro Taki, Kasugai, Japan

[73] Assignee: Fujitsu Limited, Kawasaki, Japan

[21] Appl. No.: 08/756,678

[22] Filed: Nov. 26, 1996

[30] Foreign Application Priority Data

Feb. 29, 1996 [JP] Japan ................................. 8-042935

[51] Int. Cl.[7] .................................................. G06F 12/02
[52] U.S. Cl. .............................. 711/167; 710/52; 710/53;
710/60; 710/61; 713/500; 713/502; 713/503;
713/600; 711/116
[58] Field of Search ................................... 711/148, 157,
711/168, 173, 116, 167; 710/130, 52, 53,
60, 61; 713/500, 502, 503, 600

[56] References Cited

U.S. PATENT DOCUMENTS

| | | | |
|---|---|---|---|
| 4,787,055 | 11/1988 | Bergeon et al. | 364/726.03 |
| 5,195,182 | 3/1993 | Sasson | 710/53 |
| 5,270,714 | 12/1993 | Tanaka et al. | 341/59 |
| 5,424,733 | 6/1995 | Fimoff et al. | 341/67 |
| 5,428,763 | 6/1995 | Lawler | 710/127 |
| 5,463,577 | 10/1995 | Oowaki et al. | 365/63 |
| 5,572,691 | 11/1996 | Koudmani | 711/5 |
| 5,675,424 | 10/1997 | Park | 358/426 |
| 5,805,912 | 9/1998 | Johnson et al. | 712/40 |

*Primary Examiner*—Hiep T. Nguyen
*Attorney, Agent, or Firm*—Staas & Halsey, LLP

[57] ABSTRACT

An apparatus for processing transfer data to be transferred in synchronism with one of an external write signal and an external read signal, includes a plurality of memories for storing the transfer data. A plurality of sync signal generators are provided in association with the memories, to generate one of a sync write signal and a sync read signal, which determine write and read timings for the memories, in response to one of the external write signal and the external read signal and an internal clock having a longer period than the one of said external write signal and the external read signal. A distribution circuit is connected to the plurality of sync signal generators, for receiving one of the external write signal and the external read signal and sequentially distributing the one of the external write signal and the external read signal to the sync signal generators. A plurality of address control circuits, are respectively connected between the memories and the sync signal generators, to control the memories in such a way as to write and read the transfer data into and from the memories in synchronism with one of the sync write signal and the sync read signal.

18 Claims, 7 Drawing Sheets

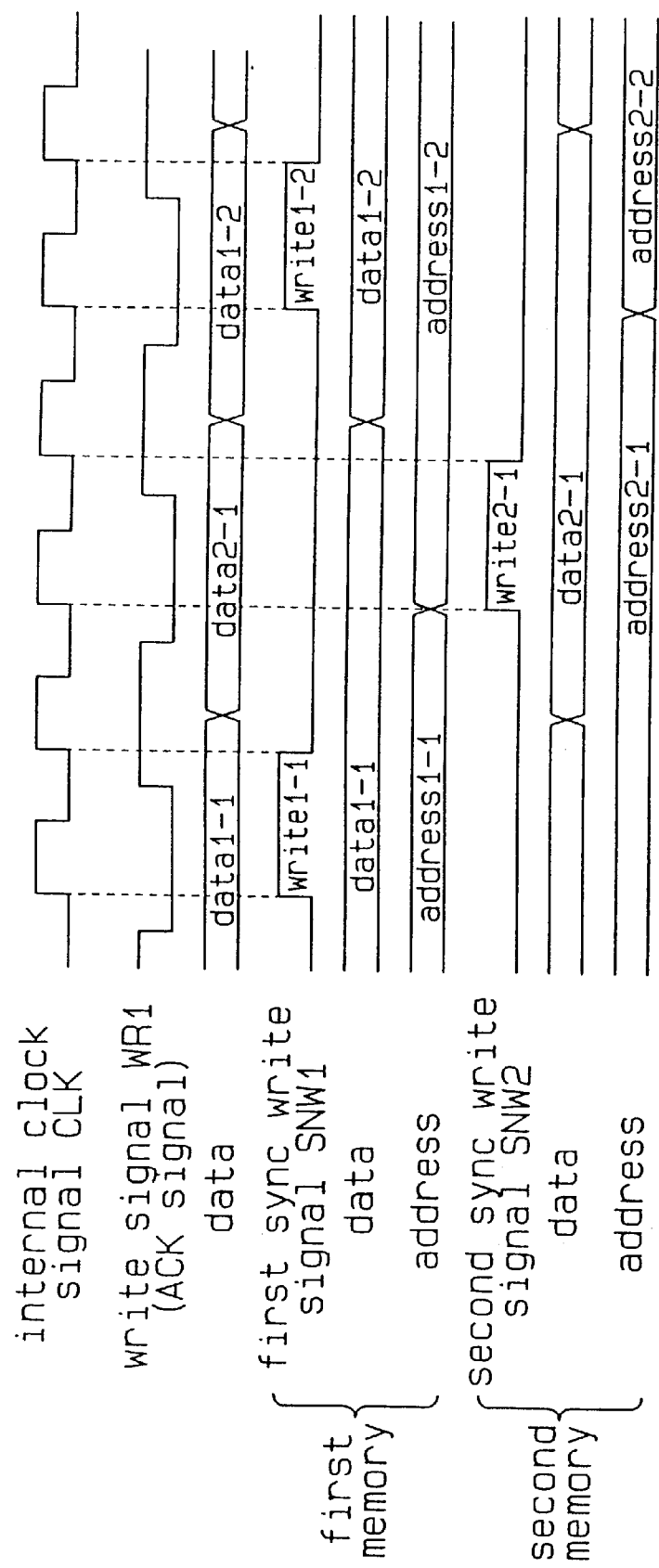

METHOD AND APPARATUS FOR FAST DATA TRANSFER USING INTERNAL CLOCK OF RELATIVELY LOW FREQUENCY

CROSS REFERENCE TO RELATED APPLICATIONS

This application is based upon and claims priority from Japanese Patent Application No. 8-042935, filed on Feb. 29, 1996, the contents of which are incorporated herein by reference.

BACKGROUND OF THE INVENTION

1. Field of the Invention

The present invention relates to a method and apparatus for processing synchronously transferred data, and, more particularly, to a data processing method and a SCSI protocol controller suitable for data transfer using SCSI (Small Computer System Interface).

2. Description of the Related Art

Interfaces which can transfer a vast amount of data between a personal computer and peripheral devices at a fast transfer rate are essential in the multimedia environment. A system interface called "SCSI" is one of such interfaces. SCSI defines two kinds of data transfer systems, synchronous transfer and asynchronous transfer. The synchronous transfer which is excellent in accomplishing a fast transfer rate can be adapted to the SCSI-3 standard of the next generation of computers.

A SCSI protocol controller constituted by a single large scale semiconductor integrated circuit (LSI) chip has an internal memory device (e.g., a data register such as FIFO). FIG. 1 presents a timing chart illustrating the write timing of the data register which operates in response to a request (REQ) signal or an acknowledge (ACK) signal in synchronous transfer.

The ACK and REQ signals are control signals for transferring data supplied from the microprocessor unit or DMA controller in a personal computer. Eight-bit parallel data is transferred within a period where the ACK signal falls to the Low level, then rises to the Hi level and falls to the Low level again.

For example, the SCSI protocol controller holds data supplied from a SCSI bus in the setup period, and then sets a sync write signal SNWR to the Hi level in response to the Low level ACK signal and the rising of an internal clock signal CLK. This sync write signal SNWR falls to the Low level in response to the next rising of the clock signal CLK.

When the sync write signal SNWR rises, the protocol controller writes data into the internal memory device (data register) in accordance with an address in an address counter incorporated in this protocol controller. The address counter increments the address by "1" in response to the Low level sync write signal SNWR and the rising of the first internal clock signal CLK output after writing. As a result, the write address for the next data is designated.

Next, after holding the next data, the protocol controller sets the sync write signal SNWR to the Hi level again in response to the Low level ACK signal and the internal clock signal CLK. The protocol controller writes new eight-bit parallel data into the internal memory device in accordance with the address in the address counter.

The data transfer rate in the synchronous transfer is determined by the frequency of the ACK (REQ) signal. In other words, an ACK (REQ) signal having a relatively high frequency increases the data transfer rate. The timings for the write signal and the address change in the address counter at the time of writing data into the internal memory device are determined based on the internal clock signal CLK in consideration of the setup time and hold time. The internal clock is generated in such a way that several clock pulses are generated for one period of the ACK (REQ) signal. In FIG. 1, four clock pulses are produced for one period of the ACK (REQ) signal. This means that the protocol controller produces the internal clock CLK whose frequency is four times the frequency of the ACK (REQ) signal.

Increasing the frequency of the ACK (REQ) signal to make data transfer faster requires that the frequency of the internal clock signal CLK be increased even moreso. This raising of the frequency of the internal clock signal CLK increases the number of operations of each circuit element. This increases the consumed power of the protocol controller. A considerable amount of both work and time are needed to design a fast circuit for a single chip SCSI protocol controller which conforms to the SCSI-3 (Fast-20) standard of the next generation that permits fast data transfer.

SUMMARY OF THE INVENTION

Broadly speaking, the present invention relates to a method and apparatus for processing synchronously transferred data, which transfer data fast in a synchronous transfer mode without using an internal clock signal having a relatively high frequency.

The present invention can be implemented in numerous ways including as an apparatus and a method.

Objects of the present invention are achieved by a method of processing transfer data, comprising the steps of using a plurality of memories for storing the transfer data and a plurality of address control circuits provided in association with the memories for controlling writing and reading of the transfer data to and from the memories, sequentially supplying one of a write signal and a read signal to each of the address control circuits, and controlling the memories in such a manner that the transfer data is written to and read from the memories in order by any address control circuit which is responsive to one of the write signal and the read signal.

Other objects of the present invention are achieved by a method of processing transfer data to be transferred in synchronism with one of an external write signal and an external read signal, comprising the steps of using a plurality of memories for storing the transfer data and a plurality of address control circuits provided in association with the memories for controlling writing and reading of transfer data to and from the memories, generating one of a sync write signal and a sync read signal synchronous with an internal clock, sequentially supplying one of the sync write signal and the sync read signal to each of the address control circuits, and controlling the memories in such a manner that the transfer data is written to and read from the memories in order by any address control circuit which is responsive to one of the sync write signal and the sync read signal.

Still further objects of the present invention are achieved by a method of processing transfer data to be transferred from and to a SCSI bus in synchronism with one of an ACK signal and a REQ signal, comprising the steps of using a plurality of memories for storing the transfer data and a plurality of address control circuits provided in association with the memories for controlling writing and reading of transfer data to and from the memories, generating one of a sync write signal and a sync read signal synchronous with an internal clock based on one of the ACK signal and the REQ signal, sequentially supplying one of the sync write signal and the sync read signal to each of the address control circuits, and controlling the memories in such a manner that the transfer data is written to and read from the memories in order by any address control circuit which is responsive to one of the sync write signal and the sync read signal.

Yet even further objects of the present invention are achieved by an apparatus for processing transfer data to be transferred in synchronism with one of an external write signal and an external read signal, comprising a plurality of memories for storing the transfer data, a plurality of sync signal generators, provided in association with the memories, for generating one of a sync write signal and a sync read signal, which determine write and read timings for the memories, in response to one of the external write signal and the external read signal and an internal clock having a longer period than the one of the external write signal and the external read signal, a distribution circuit, connected to the plurality of sync signal generators, for receiving one of the external write signal and the external read signal and sequentially distributing the one of the external write signal and the external read signal to the sync signal generators, and a plurality of address control circuits, respectively connected between the memories and the sync signal generators, for controlling the memories in such a way as to write and read the transfer data into and from the memories in synchronism with one of the sync write signal and the sync read signal.

Further objects of the present invention are achieved by a SCSI protocol controller for processing transfer data to be transferred in synchronism with an external write signal or an external read signal each generated based on an ACK signal or a REQ signal, comprising a plurality of memories for storing the transfer data, a plurality of sync signal generators, provided in association with the memories, for generating one of a sync write signal and a sync read signal, which determine write and read timings for the memories, in response to one of the external write signal and the external read signal and an internal clock having a longer period than the one of the external write signal and the external read signal, a distribution circuit, connected to the plurality of sync signal generators, for receiving one of the external write signal and the external read signal and sequentially distributing the one of the external write signal and the external read signal to the sync signal generators, and a plurality of address control circuits, respectively connected between the memories and the sync signal generators, for controlling the memories in such a way as to write and read the transfer data into and from the memories in synchronism with one of the sync write signal and the sync read signal.

Other aspects and advantages of the invention will become apparent from the following description, taken in conjunction with the accompanying drawings, illustrating by way of example the principals of the invention.

BRIEF DESCRIPTION OF THE DRAWINGS

Other objects, features, and characteristics of the present invention as well as methods of manufacture and economies of scale will become apparent to one skilled in the art from a study of the following detailed description in connection with the appended claims and drawings, all of which form a part of this specification. In the drawings:

FIG. 8 is a timing chart illustrating the writing into a data register by a first control circuit in a SCSI protocol controller according to another embodiment of the invention.

DETAILED DESCRIPTION OF THE PREFERRED EMBODIMENTS

Figure 2:
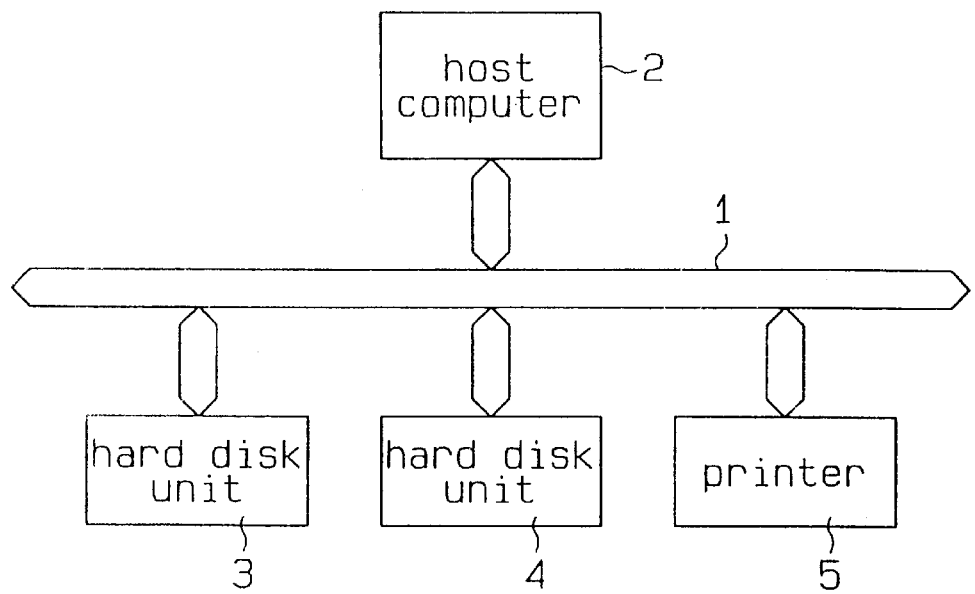
FIG. 2 is a diagram showing an SCSI system according to a first embodiment of the invention.

A synchronous transfer data processing apparatus according to one embodiment of the present invention will now be described with reference to the accompanying drawings. As shown in FIG. 2, a SCSI system which conforms to the SCSI-3 (Fast-20) standard includes a host computer 2, hard disk units 3 and 4, and a printer 5, all connected to a SCSI bus 1. (The components 3, 4 and 5 are peripheral devices.) The host computer 2, the hard disk units 3 and 4 and the printer 5 incorporate their own SCSI protocol controllers for mutual data transfer.

Figure 3:
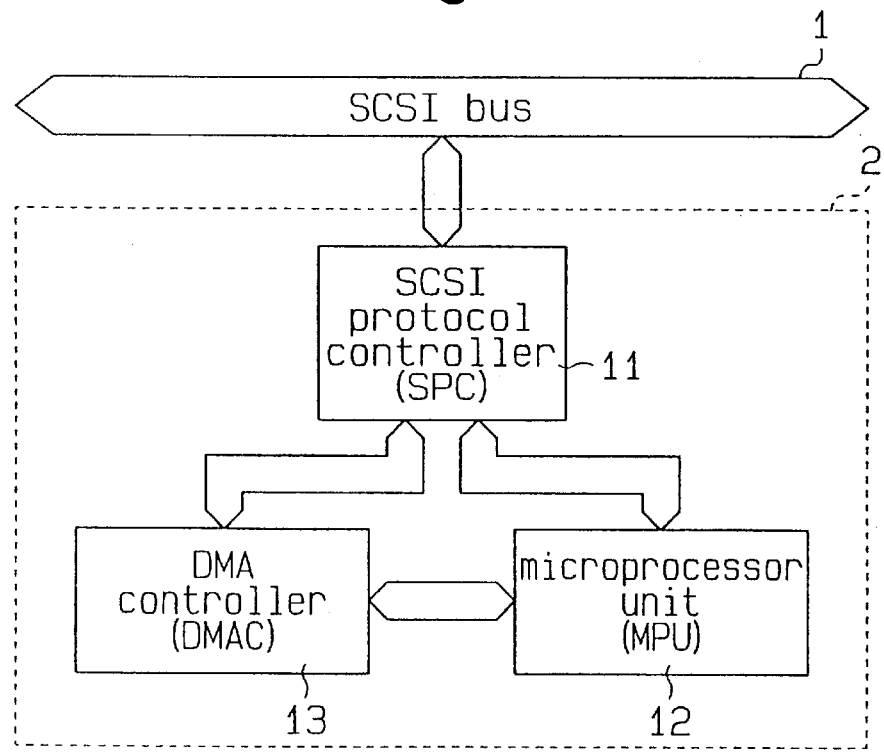
FIG. 3 is a block diagram depicting a SCSI protocol controller incorporated in a host computer in FIG. 2.

As shown in FIG. 3, the host computer 2 has a SCSI protocol controller (SPC) 11, a microprocessor unit (MPU) 12 and a DMA (Direct Memory Access) controller (DMAC) 13. Each of the SPC 11, the MPU 12 and the DMAC 13 is formed by a single LSI. The SPC 11 exchanges control signals for data transfer and transfers data between the MPU 12 and the DMAC 13. The SPC 11 is connected via the SCSI bus 1 to the SPCs respectively incorporated in the hard disk units 3 and 4 and the printer 5.

Figure 4:
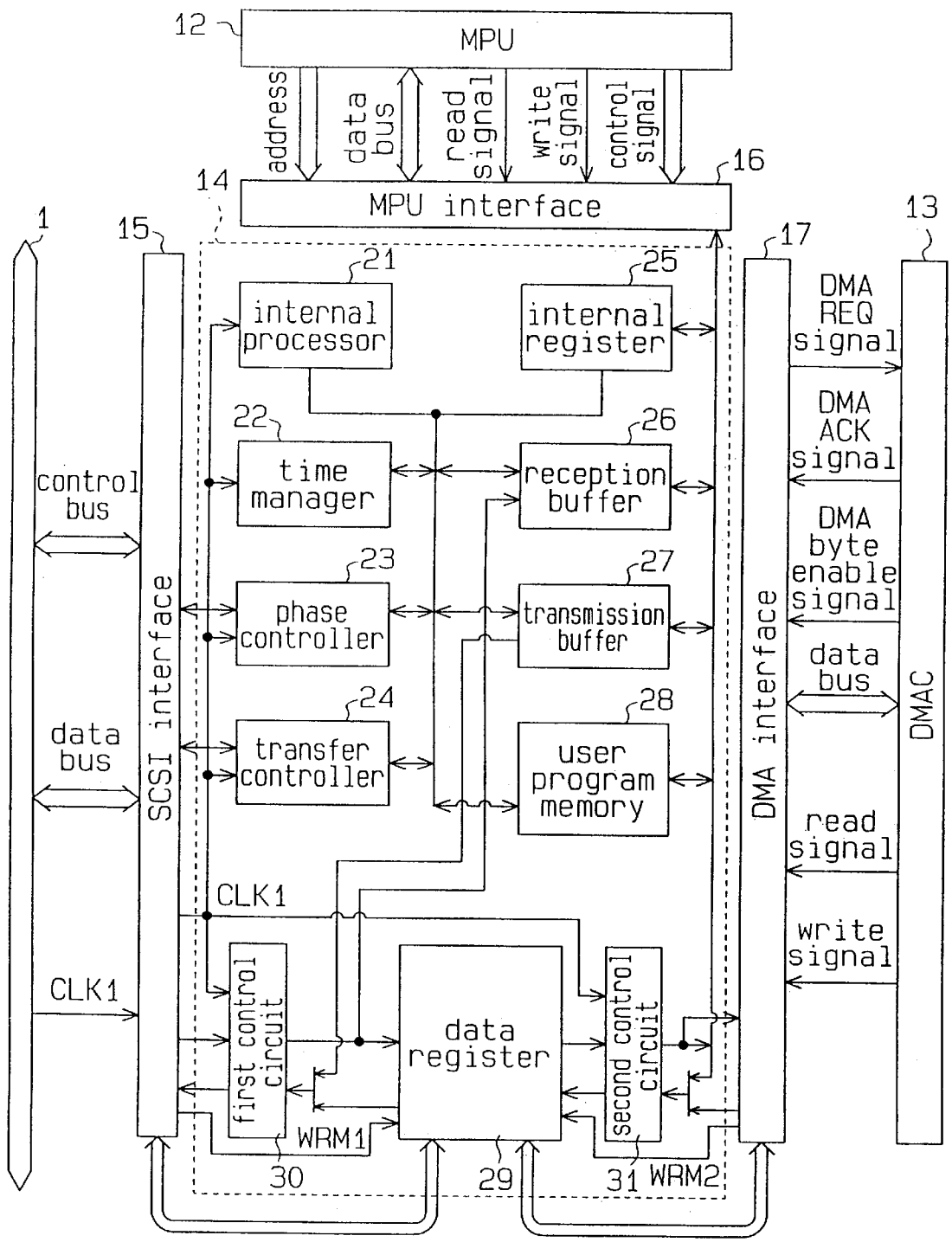
FIG. 4 is a block circuit diagram illustrating the SCSI protocol controller according to a first embodiment of the invention.

As shown in FIG. 4, the SPC 11 has an internal circuit section 14, a SCSI interface 15, an MPU interface 16 and a DMA interface 17. The SCSI interface 15, which is connected to the SCSI bus 1, exchanges control signals, such as an ACK signal and REQ signal, eight-bit parallel data and an external clock signal CLK1 between the internal circuit 14 and the SCSI bus 1. The MPU interface 16, connected to the MPU 12, exchanges control signals, an address signal, eight-bit parallel data, a read signal and a write signal between the MPU 12 and the internal circuit 14. The DMA interface 17, connected to the DMAC 13, exchanges the control signals, such as the ACK signal, the REQ signal, the read signal and the write signal, and eight-bit parallel data between the DMAC 13 and the internal circuit 14.

The internal circuit 14 includes an internal processor 21, a time manager 22, a phase controller 23, a transfer controller 24, an internal register 25, a reception buffer 26, a transmission buffer 27, a user program memory 28, a data register 29, and first and second control circuits 30 and 31.

The internal processor 21 performs sequence control between buses and between phases. The time manager 22 includes a timer and manages the time specification of the SCSI. The time manager 22 also manages various kinds of times, such as the retry time in selection/reselection, the timeout time for selection/reselection, and the timeout times of the REQ signal and ACK signal during the transfer operation. The phase controller 23 controls the arbitration, the selection/reselection, the data in/out phase, and the in/out phases for commands, statuses and messages, which are executed by the SCSI.

The transfer controller 24 controls the transfer phases for data, commands, statuses and messages. The internal register 25 mainly includes a command register, a nexus status register, a SCSI control signal status register, an interrupt status register, a command step register and a group 6/7 command length setting register. The command register retains various kinds of commands. The nexus status register indicates the status of a chip, the identification (ID) number of a unit which has a nexus and the status of the data register 29. The SCSI control signal status register indicates the status of the SCSI control signal. The interrupt status register indicates the interrupt status. The command step register indicates the status of the execution of a command. The group 6/7 command length setting register sets the command length of the group 6/7, which is undefined in the SCSI standard.

The reception buffer 26 is used exclusively to retain a message, a command and a status the SCSI has received. The transmission buffer 27 is used exclusively to retain a message, a command and a status the SCSI has issued. The user program memory 28 stores a programmable command, which is set by the user as needed.

The data register 29 is a data buffer for retaining data in the data phase which is executed by the SCSI. The first control circuit 30 controls data writing and reading between the data register 29 and the hard disk units 3 and 4 and the printer 5 in the data phase executed by the SCSI. The second control circuit 31 controls data writing and reading between the DMAC 13 and the data register 29 in the data phase executed by the SCSI.

Figure 5:
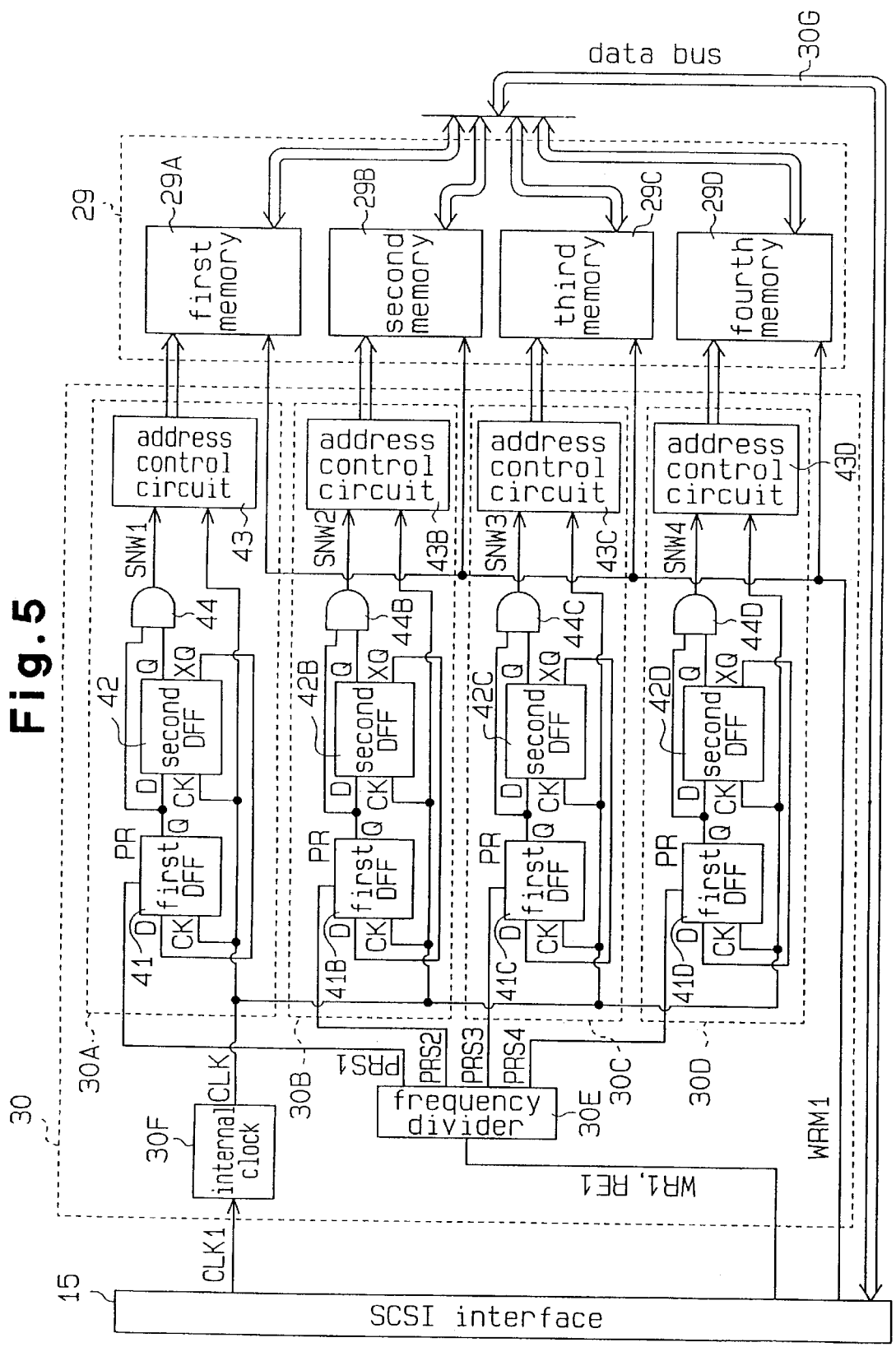
FIG. 5 is a block circuit diagram illustrating a data register and a first control circuit in the SCSI protocol controller in FIG. 4.

As shown in FIG. 5, the data register 29 includes four memories 29A through 29D. In this embodiment, each of the memories 29A–29D is a readable and rewritable memory having a storage capacity of 512 bytes. Each of the memories 29A–29D receives a mode select signal WRM1 indicating a write mode or read mode, supplied from the SCSI interface 15. Each of the memories 29A–29D also receives a mode select signal WRM2 indicative of a write mode or read mode, supplied from the DMA interface 17 (see FIG. 6). The first to fourth memories 29A–29D may be realized by FIFO (First In First Out) registers.

The first to fourth memories 29A–29D sequentially write eight-bit parallel data supplied via a data bus 30G from the SCSI interface 15 in write mode in response to the mode select signal WRM1 or WRM2. Specifically, the first memory 29A stores eight-bit parallel data first, the second memory 29B stores the next eight-bit parallel data supplied, the third memory 29C stores the next eight-bit parallel data supplied, and the fourth memory 29D stores the next eight-bit parallel data supplied. After parallel data is stored in the fourth memory 29D, the first to fourth memories 29A–29D store parallel data in sequential order.

The first to fourth memories 29A–29D sequentially output eight-bit parallel data in read mode. Specifically, first, eight-bit parallel data is read from the first memory 29A, then eight-bit parallel data is read from the second memory 29B, and then eight-bit parallel data is read from the third memory 29C followed by the reading of eight-bit parallel data from the fourth memory 29D. After parallel data is read from the fourth memory 29D, parallel data is sequentially read from the first to fourth memories 29A–29D.

The first control circuit 30 connected between the data register 29 and the SCSI interface 15 includes first to fourth address controllers 30A to 30D, a frequency divider 30E as a distribution circuit, and an internal clock generator 30F.

Figure 7:
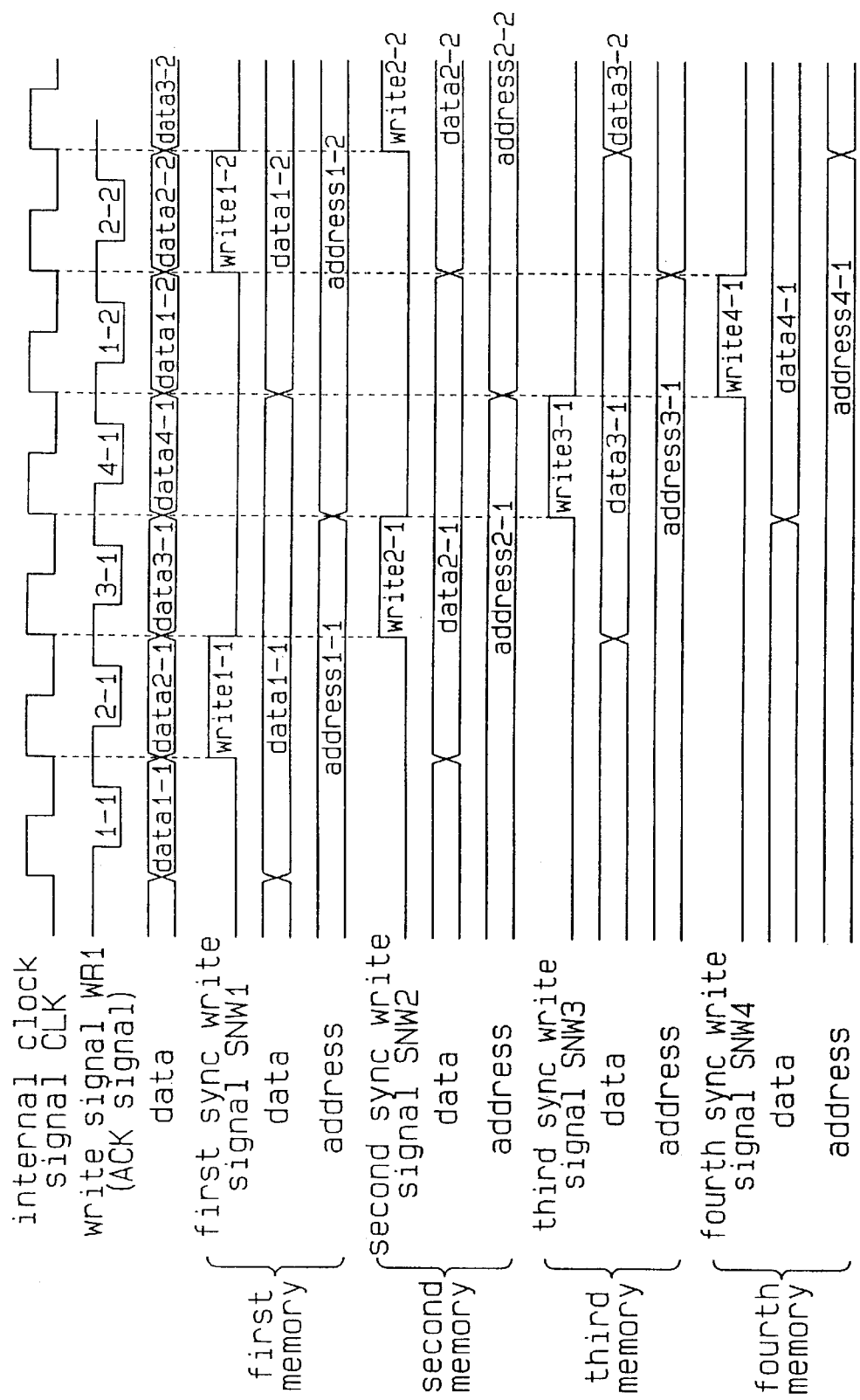
FIG. 7 is a timing chart illustrating the writing into the data register by the first control circuit.

The frequency divider 30E receives the write signal WR1 supplied from the SCSI interface 15 in write mode, and receives the read signal RE1 supplied from the SCSI interface 15 in read mode. The SCSI interface 15 produces the write signal WR1 or read signal RE1 in response to the ACK signal and REQ signal supplied from a peripheral device. The write signal WR1 and read signal RE1 have the same period. However, the period shown for WR1 or RE1 in FIG. 7 is intended to be shorter than the period of the internal clock, CLK. The periods of the write signal WR1 and read signal RE1 in the SCSI system of the SCSI-3 (Fast-20) standard according to this embodiment, like those of the ACK signal and REQ signal, are shorter than those of the conventional SCSI system.

The frequency divider 30E has four output terminals respectively connected to the first to fourth address controllers 30A–30D. The frequency divider 30E sequentially generates first to fourth preset signals PRS1 to PRS4 in response to the write signal WR1 (or the read signal RE1), and supplies those first to fourth preset signals PRS1–PRS4 to the respective first to fourth address controllers 30A–30D in order. This will be discussed below specifically. The frequency divider 30E outputs the Low-level first preset signal PRS1 during the period from the first falling of the write signal WR1 (or the read signal RE1) to the rising thereof, and outputs the Low-level second preset signal PRS2 during the period from the next falling of the write signal WR1 to the rising thereof. The frequency divider 30E outputs the Low-level third preset signal PRS3 during the period from the third falling of the write signal WR1 to the rising thereof, and outputs the Low-level fourth preset signal PRS4 during the period from the fourth falling of the write signal WR1 to the rising thereof. Thereafter, the frequency divider 30E repeats the same operation to sequentially produce and output the first to fourth preset signals PRS1–PRS4. In this manner, the frequency divider 30E supplies the write signal WR1 (or the read signal RE1) as the first to fourth preset signals PRS1–PRS4 to the associated first to fourth address controllers 30A–30D.

The first address controller 30A includes two D flip-flops (DFFs) 41 and 42, an address control circuit 43 and an AND gate 44. The first and second DFFs 41 and 42 and the AND gate 44 form a sync signal generator for the first memory 29A. The first DFF 41 has a preset input terminal PR for receiving the first preset signal PRS1, a clock input terminal CK for receiving the internal clock signal CLK supplied from the internal clock generator 30F, a data input terminal D connected to the reset output terminal, XQ of the second DFF 42, and a set output terminal Q connected to the data input terminal, D, of the second DFF 42 and the input terminal of the AND gate 44.

Figure 1:
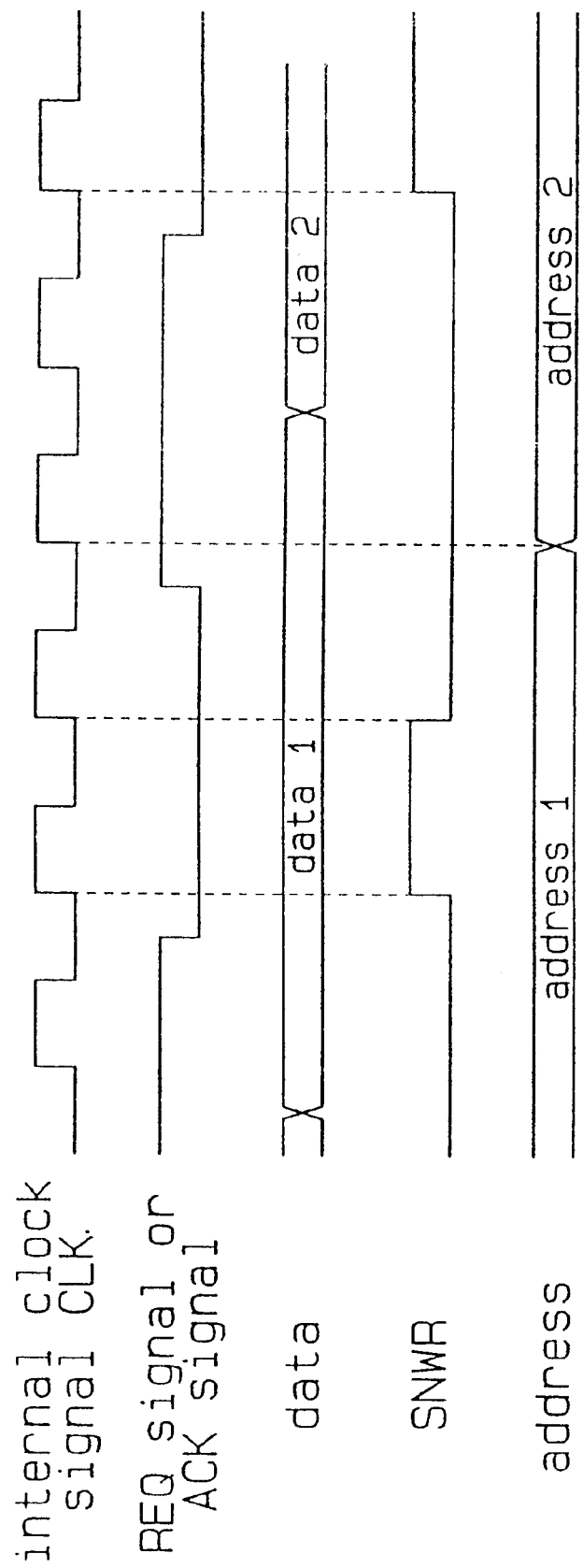
FIG. 1 is a timing chart illustrating the data writing operation of a conventional SCSI protocol controller.

The second DFF 42 has a clock input terminal CK for receiving the internal clock signal CLK supplied from the internal clock generator 30F and a set output terminal Q connected to the input terminal of the AND gate 44 in addition to the reset output terminal XQ and the input terminal D. While the periods of the ACK signal and REQ signal in this embodiment are as short as ¼ of those of the ACK signal and REQ signal in the prior art illustrated in FIG. 1, the period of the internal clock signal CLK is the same as that of the internal clock signal in the prior art in FIG. 1. The internal clock signal CLK is produced by the internal clock generator 30F in accordance with the external clock signal CLK1 supplied via the SCSI interface 15 from the MPU 12.

In response to the Low-level first preset signal PRS1, the first DFF 41 is preset and supplies the Hi-level output signal to the second DFF 42 and the AND gate 44 from the set output terminal Q. After the Low-level first preset signal PRS1 is supplied, the second DFF 42 sends the Hi-level output signal to the AND gate 44 in response to the first rising of the clock signal CLK. The AND gate 44 produces an output signal which rises to the Hi level and supplies the Hi-level output signal to the address control circuit 43 as the first sync write signal SNW1 (or the first sync read signal SNR1). The first DFF 41 supplies the Low-level output signal to the second DFF 42 from the set output terminal Q in response to the next rising of the internal clock signal CLK. Consequently, the AND gate 44 supplies the Low-level output signal (first sync write signal SNW1) to the address control circuit 43. As apparent from the above, after the first preset signal PRS1 is supplied, the Hi-level first sync write signal SNW1 (first sync read signal) is output during the period from the first rising of the internal clock signal CLK to the next rising thereof.

The address control circuit 43 includes an address counter and a memory driver. The address control circuit 43 receives the Hi-level first sync write signal SNW1 (or the first sync read signal) and the internal clock signal CLK supplied from the internal clock generator 30F. In response to the Hi-level first sync write signal SNW1, the address control circuit 43 controls the first memory 29A in such a way as to write eight-bit parallel data at the address in the first memory 29A which is currently indicated by the address counter. The address control circuit 43 increments the address of the address counter by "1" in response to the first rising of the internal clock signal CLK after the first sync write signal SNW1 has fallen to the Low level. In this manner, in response to the next first sync write signal SNW1, the address control circuit 43 sets the write address for new eight-bit parallel data to be written. In read mode, the address control circuit 43 sets the address for eight-bit parallel data to be written in the first memory 29A and controls the first memory 29A so as to read data from that address in response to the first sync read signal and the internal clock signal CLK.

The second address controller 30B, which has the same circuit structure as the first address controller 30A, receives the second preset signal PRS2 and controls the writing and reading of eight-bit parallel data with respect to the second memory 29B. The circuit components of the second address controller 30B which are identical to the DFFs 41 and 42, the address control circuit 43 and the AND gate 44 of the first address controller 30A are given the same reference numerals with "B" affixed at the end. The sync signal generator constituted by the DFFs 41B and 42B and the AND gate 44B generates a second sync write signal SNW2 (second sync read signal) in response to the second preset signal PRS2 and the internal clock signal CLK and supplies this signal to the address control circuit 43B. The address control circuit 43B controls the writing of eight-bit parallel data into the second memory 29B in response to the second sync write signal SNW2 and the internal clock signal CLK.

The second address controller 30B generates the second sync write signal SNW2 which rises at the same time as the first sync write signal SNW1 falls. This is because each sync write signal is produced in synchronism with the clock period. Specifically, the periods in which the first and second sync write signals SNW1 and SNW2 hold the Hi levels are determined by the period of the clock signal CLK. Further, the second preset signal PRS2 is supplied to the second address controller 30B after the first sync write signal SNW1 is generated by the first rising of the internal clock signal CLK and before this sync write signal SNW1 falls due to the next rising of the internal clock signal CLK. This allows the address controller 30B to produce the second sync write signal SNW2 in response to the second preset signal PRS2 and the rising of the internal clock signal CLK which causes the first sync write signal SNW1 to fall to the Low level. In this manner, the first eight-bit parallel data is written in the first memory 29A by the first Low-level ACK signal supplied, and the second eight-bit parallel data is written in the second memory 29B by the second Low-level ACK signal.

The third address controller 30C, which also has the same circuit structure as the first address controller 30A, receives the third preset signal PRS3 and controls the writing and reading of eight-bit parallel data with respect to the third memory 29C. The circuit components of the third address controller 30C which are identical to the DFFs 41 and 42, the address control circuit 43 and the AND gate 44 of the first address controller 30A are given the same reference numerals with "C" affixed at the end. The sync signal generator constituted by the DFFs 41C and 42C and the AND gate 44C generates a third sync write signal SNW3 (third sync read signal) in response to the third preset signal PRS3 and the internal clock signal CLK and supplies this signal to the address control circuit 43C. The address control circuit 43C controls the writing of eight-bit parallel data into the third memory 29C in response to the third sync write signal SNW3 and the internal clock signal CLK.

The third address controller 30C generates the third sync write signal SNW3 which rises at the same time as the second sync write signal SNW2 falls. This is because the third preset signal PRS3 is supplied to the third address controller 30C before the second sync write signal SNW2 falls due to the rising of the internal clock signal CLK. This allows the third address controller 30C to produce the third sync write signal SNW3 in response to the third preset signal PRS3 and the rising of the internal clock signal CLK which causes the second sync write signal SNW2 to fall to the Low level. In this manner, the second eight-bit parallel data is written in the second memory 29B by the second ACK signal supplied, and the third eight-bit parallel data is written in the third memory 29C by the third ACK signal.

The fourth address controller 30D, which also has the same circuit structure as the first address controller 30A, receives the fourth preset signal PRS4 and controls the writing and reading of eight-bit parallel data with respect to the fourth memory 29D. The circuit components of the fourth address controller 30D which are identical to the DFFs 41 and 42, the address control circuit 43 and the AND gate 44 of the first address controller 30A are given the same reference numerals with "D" affixed at the end. The sync signal generator constituted by the DFFs 41D and 42D and the AND gate 44D generates a fourth sync write signal SNW4 (fourth sync read signal) in response to the fourth preset signal PRS4 and the internal clock signal CLK and supplies this signal to the address control circuit 43D. The address control circuit 43D controls the writing of eight-bit parallel data into the fourth memory 29D in response to the fourth sync write signal SNW4 and the internal clock signal CLK.

The fourth address controller 30D generates the fourth sync write signal SNW4 which rises at the same time as the third sync write signal SNW3 falls. This is because the fourth preset signal PRS4 is supplied to the fourth address controller 30D before the third sync write signal SNW3 falls due to the rising of the internal clock signal CLK. This allows the fourth address controller 30D to produce the fourth sync write signal SNW4 in response to the fourth preset signal PRS4 and the rising of the internal clock signal CLK which causes the third sync write signal SNW3 to fall to the Low level. In this manner, the third eight-bit parallel data is written in the third memory 29C by the third ACK signal supplied, and the fourth eight-bit parallel data is written in the fourth memory 29D by the fourth ACK signal. Thereafter, the frequency divider 30E generates the first sync write signal SNW1 again and repeats writing eight-bit parallel data in the first to fourth memories 29A–29D starting from the first memory 29A and continuing sequentially.

Figure 6:
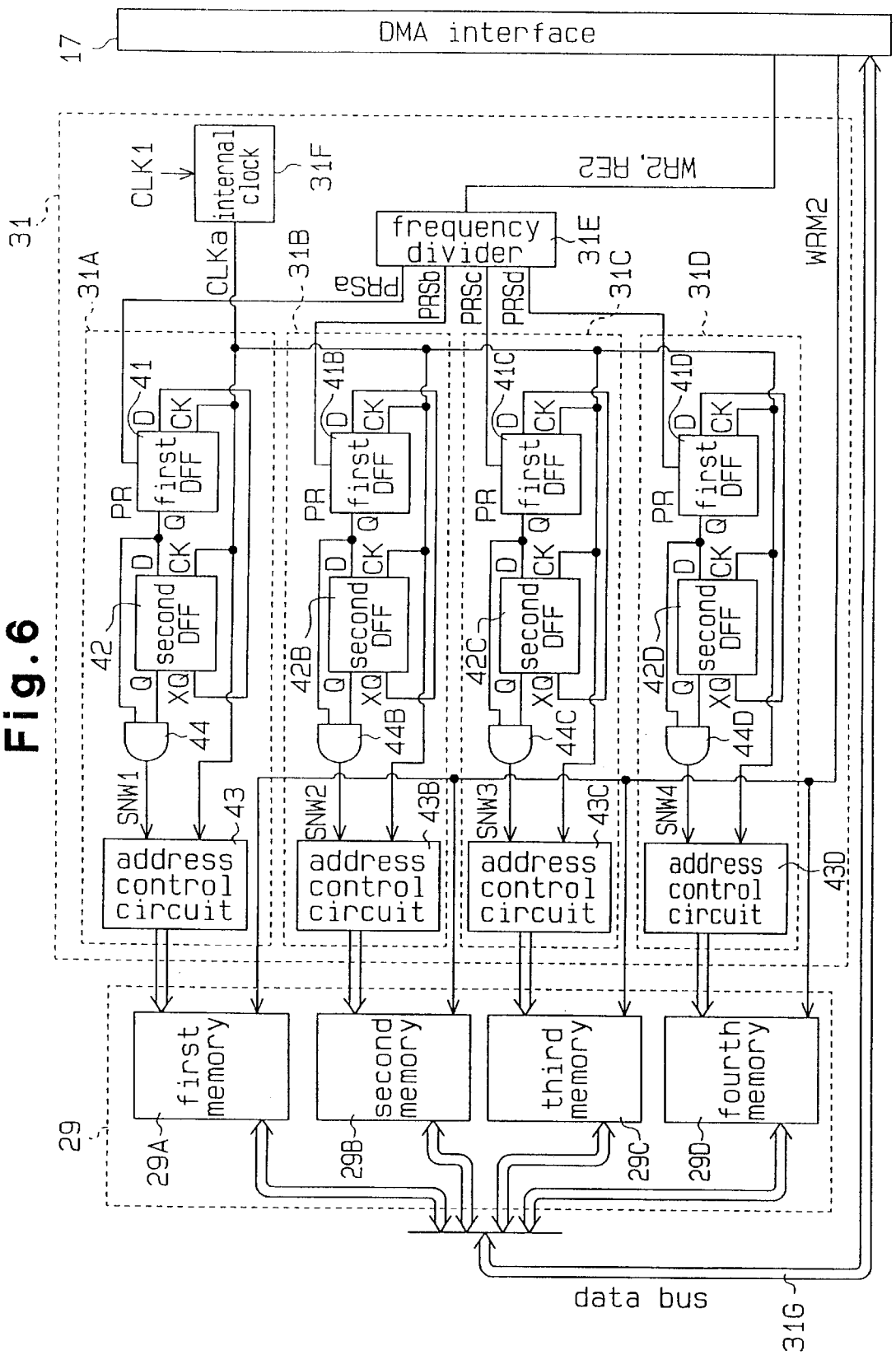
FIG. 6 is a block circuit diagram showing the data register and a second control circuit in the SCSI protocol controller in FIG. 4.

As shown in FIG. 6, the second control circuit 31 connected between the data register 29 and the DMA interface 17, like the first control circuit 30, includes first to fourth address controllers 31A to 31D, a frequency divider 31E as a distribution circuit, and an internal clock generator 31F.

The frequency divider 31E receives the write signal WR2 from the DMA interface 17 in write mode, and receives the read signal RE2 from the DMA interface 17 in read mode. This DMA interface 17 produces the write signal WR2 or read signal RE2 in response to the DMAACK signal and DMAREQ signal supplied from the DMAC 13. The periods of the write signal WR2 and read signal RE2 are the same as the periods of the ACK signal and REQ signal. In the SCSI system which conforms to the SCSI-3 (Fast-20) standard in this embodiment, the periods of the DMAACK signal and DMAREQ signal, like those of the ACK signal and REQ signal, are short.

The frequency divider 31E generates first to fourth preset signals PRSa to PRSd in response to the write signal WR2 in write mode. The frequency divider 31E produces the first to fourth preset signals PRSa–PRSd in response to the read signal RE2 in read mode. The frequency divider 31E supplies the Low-level first preset signal PRSa to the first address controller 31A during the period from the first falling of the write signal WR2 to the rising thereof, and supplies the Low-level second preset signal PRSb to the second address controller 31B during the period from the next falling of the write signal WR2 to the rising thereof. The frequency divider 31E supplies the Low-level third preset signal PRSc to the third address controller 31C during the period from the third falling of the write signal WR2 to the rising thereof, and supplies the Low-level fourth preset signal PRSd to the fourth address controller 31D during the period from the fourth falling of the write signal WR2 to the rising thereof. Thereafter, the frequency divider 31E repeats the same operation to sequentially produce and output the first to fourth preset signals PRSa–PRSd to the associated address controllers.

The internal clock generator 31F receives the external clock signal CLK1 and generates an internal clock signal CLKa having the same period as that of the internal clock signal CLK which is produced by the internal clock generator 30F.

The first to fourth address controllers 31A–31D have the same circuit structures as the first to fourth address controllers 30A–30D in the first control circuit 30, and operate in response to the first to fourth preset signals PRSa–PRSd and the internal clock signal CLKa. To avoid the redundant description, like or same reference numerals as given to the components in the first to fourth address controllers 30A–30D are given to those components in the first to fourth address controllers 31A–31D. In write mode, the first to fourth address controllers 31A–31D operate in such a way as to sequentially write eight-bit parallel data at predetermined addresses in the first to fourth memories 29A–29D in synchronism with the respective sync write signals SNW1–SNW4. The eight-bit parallel data is continuously supplied to the second control circuit 31 via the data bus 31G from the DMA interface 17 in synchronism with the write signal WR2. In read mode, the first to fourth address controllers 31A–31D operate in such a manner as to sequentially read eight-bit parallel data from predetermined addresses in the first to fourth memories 29A–29D in synchronism with the respective sync read signals. The read eight-bit parallel data is supplied via the data bus 31G to the DMA interface 17 in synchronism with the read signal RE2.

The operations of the first and second control circuits 30 and 31 will be now discussed. The following describes only the operation of the first control circuit 30 for the following reasons. First, the second control circuit 31 operates in response to the first to fourth preset signals PRSa–PRSd equivalent to the first to fourth preset signals PRS1–PRS4 and the internal clock signal CLKa equivalent to the internal clock signal CLK. Secondly, the first control circuit 30 which is used for data transfer between the data register 29 and the SCSI interface 15 performs basically the same operation as the second control circuit 31 which is used for data transfer between the data register 29 and the DMAC 13.

The following description is given with reference to the case where the SPC 11 is currently in the data phase and data transferred from, for example, the hard disk unit 3 is written in the data register 29. The hard disk unit 3 supplies the ACK signal to the SCSI interface 15. As shown in FIG. 7, the SCSI interface 15 outputs the write signal WR1 to the first control circuit 30 in response to the ACK signal. This write signal WR1 has the same waveform as the ACK signal. The hard disk unit 3 transfers eight-bit parallel data together with the ACK signal to the SCSI interface 15. One eight-bit parallel data is transferred during the period in which the ACK signal (write signal WR1) falls to the Low level, rises to the Hi level, and then falls again. In other words, new eight-bit parallel data is supplied to the SCSI interface 15 from the hard disk unit 3 every time the ACK signal (write signal WR1) falls to the Low level.

In response to the write signal WR1, the frequency divider 30E in the first control circuit 30 supplies the first to fourth preset signals PRS1–PRS4 to the associated first to fourth address controllers 30A–30D in order. In response to the first falling of the write signal WR1, the first preset signal PRS1 is supplied to the first address controller 30A. After receiving the first preset signal PRS1, the first address controller 30A supplies the Hi-level first sync write signal SNW1 to the address control circuit 43 in response to the first rising of the internal clock signal CLK. In response to the Hi-level first sync write signal SNW1, the address control circuit 43 controls the first memory 29A in such a manner that the first eight-bit parallel data is written at the address in the first memory 29A which matches with the address indicated by the address counter. This first parallel data is transferred in synchronism with the first ACK signal (write signal WR1). During the data writing, the frequency divider 30E supplies the second preset signal PRS2 to the first DFF 41B in response to the next falling of the write signal WR1. The second address controller 30B therefore waits for the next (second) rising of the internal clock signal CLK to generate the second sync write signal SNW2.

In response to the next rising of the internal clock signal CLK, the first address controller 30A outputs the Low-level first sync write signal SNW1 and increments the address in the address counter in the address control circuit 43 by "1".

The second address controller 30B supplies the Hi-level second sync write signal SNW2 to the address control circuit 43B in response to the second rising of the internal clock signal CLK. In response to this second sync write signal SNW2, the address control circuit 43B controls the second memory 29B in such a way that second eight-bit parallel data is written at the address in the second memory 29B which matches with the address indicated by the address counter. This second parallel data is transferred in synchronism with the second ACK signal (write signal WR1). During this data writing, the frequency divider 30E supplies the third preset signal PRS3 to the first DFF 41C in response to the third falling of the write signal WR1. The third address controller 30C therefore waits for the third rising of the internal clock signal CLK to generate the third sync write signal SNW3.

In response to the third rising of the internal clock signal CLK, the second address controller 30B outputs the Low-level second sync write signal SNW2 and increments the address in the address counter in the address control circuit 43B by "1". The third address controller 30C supplies the Hi-level third sync write signal SNW3 to the address control circuit 43C in response to the third rising of the internal clock signal CLK. In response to this third sync write signal SNW3, the address control circuit 43C controls the third memory 29C in such a way that third eight-bit parallel data is written at the address in the third memory 29C which matches with the address indicated by the address counter. This third parallel data is transferred in synchronism with the third ACK signal (write signal WR1). During this data writing, the frequency divider 30E supplies the fourth preset signal PRS4 to the fourth DFF 41D in response to the fourth falling of the write signal WR1. The fourth address controller 30D therefore waits for the fourth rising of the internal clock signal CLK to generate the fourth sync write signal SNW4.

In response to the fourth rising of the internal clock signal CLK, the third address controller 30C outputs the Low-level third sync write signal SNW3 and increments the address in the address counter in the address control circuit 43C by "1". The fourth address controller 30D supplies the Hi-level fourth sync write signal SNW4 to the address control circuit 43D in response to the fourth rising of the internal clock signal CLK. In response to this fourth sync write signal SNW4, the address control circuit 43D controls the fourth memory 29D in such a way that fourth eight-bit parallel data is written at the address in the fourth memory 29D which matches with the address indicated by the address counter. This fourth parallel data is transferred in synchronism with the fourth ACK signal (write signal WR1). During this data writing, the frequency divider 30E supplies the first preset signal PRS1 again to the first DFF 41 in response to the fifth falling of the write signal WR1. The first address controller 30A therefore waits for the fifth rising of the internal clock signal CLK to generate the first sync write signal SNW1.

In response to the fifth rising of the internal clock signal CLK, the fourth address controller 30D outputs the Low-level fourth sync write signal SNW4 and increments the address in the address counter in the address control circuit 43D by "1". The first address controller 30A supplies the Hi-level first sync write signal SNW1 to the address control circuit 43 in response to the fifth rising of the internal clock signal CLK. In response to this first sync write signal SNW1, the address control circuit 43 controls the first memory 29A in such a way that fifth eight-bit parallel data is written at the address in the first memory 29A which matches with the address incremented by "1" indicated by the address counter. This fifth parallel data is transferred in synchronism with the fifth ACK signal (write signal WR1). Thereafter, the same operation is repeated to consecutively distribute and write eight-bit parallel data to the first to fourth memories 29A–29D in order in synchronism with the ACK signal.

Individual pieces of data distributively written in the first to fourth memories 29A–29D are sequentially read from the first memory 29A first and are transferred to the hard disk unit 3 via the SCSI interface 15 in response to the read signal from the SCSI interface 15. In read mode, the frequency divider 30E generates the first to fourth preset signals PRS1–PRS4 in response to the read signal in place of the write signal WR1. The first to fourth address controllers 30A–30D respectively generate the first to fourth sync read signals in response to the first to fourth preset signals PRS1–PRS4 and the internal clock signal CLK. In response to the first to fourth sync read signals, the individual address control circuits 43, 43B, 43C and 43D control the respective memories 29A–29D in such a way that data are read from the associated memories 29A–29D from the addresses indicated by the respective incorporated address counters. This data reading permits data, sequentially distributed and written into the first to fourth memories 29A–29D, to be sequentially read therefrom starting from the first memory 29A.

As apparent from the above detailed description, the data register 29 in this embodiment includes four (first to fourth) memories 29A–29D where parallel data which is transferred in synchronism with the ACK signal is sequentially and distributively, written in write mode. In read mode, the parallel data written in the first to fourth memories 29A–29D are sequentially read therefrom in synchronism with the read signal. This structure allows the individual memories 29A–29D to perform data writing and reading at one fourth the speed of the data transfer speed. It is therefore possible to set the frequencies of the internal clock signals CLK and CLKa lower. Those internal clock signals CLK and CLKa are used to generate the first to fourth sync write signals SNW1–SNW4 and the first to fourth sync read signals which determine the write timing and read timing. Accordingly, data transfer can be accomplished by using the internal clock signals CLK and CLKa which have low frequencies of one fourth the frequency of the internal clock signal used by the conventional data register which has a single memory structure. The operation of the address controllers 30A–30D and 31A–31D by the internal clock signal CLK having the low frequency permits the consumed power to be reduced. This eliminates the need for a complicated circuit which copes with a high frequency, thus facilitating the circuit design.

In this embodiment, the invention is adapted to a SCSI system whose transfer speed conforms to the SCSI-3 (Fast-20) standard and the ACK signal (REQ signal) having a relatively high frequency is used. The frequency of the internal clock signal CLK used by the SPC 11 is however one fourth the frequency of the ACK signal. This permits the use of the internal clock signal which conforms to the SCSI-2 standard. Therefore, the increase in the number of memories constituting the data register of the SCSI protocol controller (SPC) which conforms to the SCSI-2 standard and the increase in the number of the address control circuits constituting the first and second control circuits 30 and 31 can realize the SPC 11 which conforms to the SCSI-3 (Fast-20) standard. In designing a single-chip SPC 11 which conforms to the SCSI-3 (Fast-20) standard, therefore, the SPC circuit which conforms to the SCSI-2 standard can be used. This feature allows the development period to be shortened and contributes to reducing the manufacturing cost without suffering a change in the fundamental architecture of the SPC.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following forms.

The data register 29 may be constituted of two memories, three memories, or five or more memories instead of four (first to fourth) memories 29A–29D. FIG. 8 illustrates a timing chart in the case where the data register 29 in use is constituted of two memories, i.e., first and second memories 29A and 29B. The first control circuit 30 comprises first address controllers 30A and 30B. The second control circuit 31 comprises second address controllers 31A and 31B. As apparent from FIG. 8, therefore, when the frequency of the internal clock signal CLK in use is the same as the frequency of the internal clock signal CLK in the prior art shown in FIG. 1, it is possible to accomplish data transfer using the ACK signal whose frequency is two times as high as the frequency of the internal clock signal. In the embodiment shown in FIG. 8, the ACK signal and the REQ signal may be modified as needed.

The frequency of the internal clock signal CLK may be modified as needed within the scope and spirit of this invention. That is, the frequency of the internal clock signal CLK may be changed as needed in such a way as to become lower than the frequency of the internal clock signal, which is used by the data register having a single memory structure and matches with the frequencies of the ACK signal and the REQ signal.

The first and second control circuits 30 and 31 may share a single internal clock generator. The internal clock generators 30F and 31F may generate the internal clock signals CLK and CLKa directly instead of generating those clock signals in response to the external clock signal CLK1.

Therefore, the present examples and embodiments are to be considered as illustrative and not restrictive and the invention is not to be limited to the details given herein, but may be modified within the scope and equivalence of the appended claims.

What is claimed is:

1. A method of processing transfer data to be transferred in synchronism with one of an external write signal and an external read signal, comprising:
   storing in a plurality of memories said transfer data and controlling writing and reading of said transfer data to and from a plurality of address control circuits provided in association with said memories;
   reducing a frequency of one of the external write signal and the external read signal;
   generating one of a sync write signal and a sync read signals synchronous with an internal clock, from one of the frequency-reduced external write signal and the frequency-reduced external read signal;
   sequentially supplying one of said sync write signal and said sync read signal to each of said address control circuits; and
   controlling said memories in such a manner that said transfer data is written to or read from said memories in order by any address control circuit which is responsive to one of said sync write signal and said sync read signal.

2. The method according to claim 1, wherein said controlling includes writing data at an address in said memory that matches an address specified by the address control circuit that is responsive to the sync write signal or the sync read signal.

3. A method of processing transfer data to be transferred from and to a SCSI bus in synchronism with one of an ACK signal and a REQ signal, comprising:
   storing in a plurality of memories said transfer data and controlling writing and reading of said transfer data to and from said memories by a plurality of address control circuits provided in association with said memories;
   reducing a frequency of one of said ACK signal and said REQ signal;
   generating one of a sync write signal and a sync read signal, synchronous with an internal clock, based on one of said frequency-reduced ACK signal and said frequency-reduced REQ signal;
   sequentially supplying one of said sync write signal and said sync read signal to each of said address control circuits; and
   controlling said memories in such a manner that said transfer data is written to or read from said memories in order by any address control circuit which is responsive to one of said sync write signal and said sync read signal.

4. The method according to claim 3, further comprising consecutively distributing one of reading and writing parallel data to the plurality of memories in order in synchronism with said ACK signal and said REQ signal.

5. The method according to claim 3, further comprising transferring a common amount of data as a conventional apparatus having a single memory with an internal clock signal, where said plurality of memories equals n, being 1/n times the frequency of the conventional apparatus.

6. A SCSI protocol controller for processing transfer data to be transferred in synchronism with one of an external write signal corresponding to an ACK signal and an external read signal corresponding to a REQ signal, comprising:
   a plurality of memories to store said transfer data;
   a distribution circuit to receive one of said external write signal and said external read signal, to reduce the frequency of one of the external write signal and the external read signal, and to sequentially distribute said one of said frequency-reduced external write signal and said frequency-reduced external read signal;
   a plurality of sync signal generators, connected to said distribution circuit provided in association with said memories, to generate one of a sync write signal and a sync read signal, which determine write and read timings for said memories, in response to one of said frequency-reduced external write signal and said freuency-reduced external read signal and an internal clock having a longer period than said one of said external write signal and said external read signal; and
   a plurality of address control circuits, respectively connected between said memories and said sync signal generators, to control said memories in such a way as to write and read said transfer data into and from said memories in synchronism with one of said sync write signal and said sync read signal.

7. An apparatus for processing transfer data to be transferred in synchronism with one of an external write signal and an external read signal, comprising:
   a plurality of memories to store said transfer data;

a distribution circuit to receive one of said external write signal and said external read signal, to reduce a frequency of one of said external write signal and said external read signal, and to sequentially distribute said one of said reduced-frequency external write signal and said reduced-frequency external read signal;

a plurality of sync signal generators connected to said distribution circuit and provided in association with said memories, to generate one of a sync write signal and a sync read signal, which determine write and read timings for said memories, in response to one of said frequency-reduced external write signal and said frequency-reduced external read signal and an internal clock having a longer period than one of said external write signal and said external read signal; and a plurality of address control circuits, respectively connected between said memories and said sync signal generators, to control said memories in such a way as to write and read said transfer data into and from said memories in synchronism with one of said sync write signal and said sync read signal.

8. The apparatus according to claim 7, wherein said internal clock has a frequency of 1/n, where n is the number of memories in said apparatus, times that of an apparatus having a single memory.

9. The apparatus according to claim 7, wherein said generating means includes a plurality of address control circuits.

10. A SCSI protocol controller for processing transfer data to be transferred in synchronism with one of an external write signal corresponding to an ACK signal and an external read signal corresponding to a REQ signal, comprising:

a plurality of memories to store said transfer data;

a distribution circuit to receive one of said external write signal and said external read signal, to reduce the frequency of one of the external write signal and the external read signal, and to sequentially distribute said one of said frequency-reduced external write signal and said frequency-reduced external read signal;

a plurality of sync signal generators, connected to said distribution circuit provided in associated with said memories, to generate one of a sync write signal and a sync read signal, which determine write and read timings for said memories, in response to one of said frequency-reduced external write signal and said frequency-reduced external read signal and an internal clock having a longer period than said one of said external write signal and said external read signal; and a plurality of address control circuits, respectively connected between said memories and said sync signal generators, to control said memories in such a way as to write and read said transfer data into and from said memories in synchronism with one of said sync write signal and said read signal.

11. An apparatus for processing transfer data to be transferred in synchronism with one of an external write signal and an external read signal, comprising:

a plurality of storage units to store data;

means for reducing a frequency of one of the external write signal and the external read signal; and means for generating one of a sync write signal and a sync read signal, synchronous with an internal clock, from one of the frequency-reduced external write signal and said frequency-reduced external read signal, so as to transfer a predetermined amount of data in a time shorter than that achieved by an apparatus having a single storage unit.

12. A method according to claim 11, wherein said generating is responsive to one of said frequency-reduced read and said frequency-reduced write signals.

13. The apparatus according to claim 11, wherein said generating means includes a plurality of address control circuits.

14. A method for processing transfer data to be transferred in synchronism with one of an external write signal and an external read signal, comprising:

storing data in a plurality of storage units;

reducing a frequency of one of the external write signal and the external read signal; and generating one of a sync write signal and a sync read signal, synchronous with an internal clock, from one of the frequency-reduced external write signal and the frequency-reduced external read signal, so as to transfer a predetermined amount of data in a time shorter than that achieved by an apparatus having a single storage unit.

15. A method according to claim 14, wherein said generating includes controlling said storage units using a plurality of address control circuits.

16. A method according to claim 14, wherein said generating is responsive to one of said frequency reduced read and said frequency-reduced write signals.

17. An apparatus comprising:

a frequency reducing unit reducing a frequency of an external write signal; and a generating unit generating a sync write signal based on the frequency reduced write signal, said sync write signal outputted to a plurality of storage units storing transfer data.

18. An apparatus comprising:

a frequency reducing unit reducing a frequency of an external read signal; and a generating unit generating a sync read signal based on the frequency reduced read signal, said sync read signal responsive to a plurality of storage units outputting transfer data.

* * * * *

UNITED STATES PATENT AND TRADEMARK OFFICE
CERTIFICATE OF CORRECTION

PATENT NO.   : 6,081,877
DATED        : June 27, 2000
INVENTOR(S)  : Nobuhiro Taki It is certified that error appears in the above-identified patent and that said Letters Patent is hereby corrected as shown below:

<u>Column 13,</u>
Line 57, change "signals" to -- signal, --.

<u>Column 14,</u>
Line 29, after "distributing" insert -- and --.

<u>Column 15, lines 26-56 and Column 16, lines 15-17,</u>
Delete claims 9, 10 and 12.

Add the following claims:

--19. The method according to claim 5, further comprising using four memories, n=4.

20. The apparatus according to claim 7, wherein the plurality of memories totals four.

21. The apparatus according to claim 11, wherein said storage units are a plurality of memories. --

Signed and Sealed this

Ninth Day of July, 2002

*Attest:*

JAMES E. ROGAN
*Director of the United States Patent and Trademark Office*

*Attesting Officer*